United States Patent [19]

Kouchiyama

[11] Patent Number: 5,242,762
[45] Date of Patent: Sep. 7, 1993

[54] MAGNETIC RECORDING MEDIUM HAVING AN UNDERLAYER AND A THIN FILM MAGNETIC LAYER WHICH CONSISTS OF A SPECIFIED COBALT-PLATINUM-PALLADIUM ALLOY

[75] Inventor: Akira Kouchiyama, Kanagawa, Japan

[73] Assignee: Sony Corporation, Tokyo, Japan

[21] Appl. No.: 836,357

[22] Filed: Feb. 18, 1992

[30] Foreign Application Priority Data

Feb. 19, 1991 [JP] Japan ............... 3-024795

[51] Int. Cl.$^5$ ............................................. G11B 5/00
[52] U.S. Cl. ............................. 428/694 T; 428/611; 428/668; 428/900; 428/928; 252/62.55; 420/435; 148/313
[58] Field of Search ............... 148/313; 420/82, 435; 252/62.55; 428/668, 669, 670, 694, 611, 900, 928

[56] References Cited

U.S. PATENT DOCUMENTS

| | | | |
|---|---|---|---|
| 4,438,066 | 3/1984 | Aboaf et al. | 420/435 |
| 4,610,911 | 9/1986 | Opfer et al. | 428/213 |
| 4,995,923 | 2/1991 | Mizumoto et al. | 148/304 |

FOREIGN PATENT DOCUMENTS

| | | |
|---|---|---|
| 60-126879 | 7/1985 | Japan . |
| 61-246914 | 11/1986 | Japan . |
| 1118244 | 5/1989 | Japan . |
| 01191318 | 8/1989 | Japan . |
| 02030104 | 1/1990 | Japan . |

OTHER PUBLICATIONS

Japanese Patent Abstract JP2003102–Jul. 19, 1988 Abstract vol. 014138.
Japanese Patent Abstract JP2030104 Apr. 10, 1990 Abstract vol. 014178.

Primary Examiner—Paul J. Thibodeau
Assistant Examiner—Stevan A. Resan
Attorney, Agent, or Firm—Hill, Steadman & Simpson

[57] ABSTRACT

In a magnetic recording medium including a substrate and an alloy thin film magnetic layer formed on the substrate, the magnetic layer is composed of $Co_{100-y}(Pt_{100-x}Pd_x)_y$ where x is set to $0 < x \leq 80$ (atomic %), and y is set to $10 \leq y \leq 35$ (atomic %). Accordingly, a sufficiently high coercive force in an in-plane direction and a sufficiently high saturation magnetization can be obtained, and the magnetic recording medium can be produced at a low cost.

2 Claims, 2 Drawing Sheets

MAGNETIC RECORDING MEDIUM HAVING AN UNDERLAYER AND A THIN FILM MAGNETIC LAYER WHICH CONSISTS OF A SPECIFIED COBALT-PLATINUM-PALLADIUM ALLOY

BACKGROUND OF THE INVENTION

The present invention relates to a magnetic recording medium, and more particularly to a magnetic recording medium having an alloy magnetic layer suitably applicable to a hard disk adapted to carry out recording in an in-plane direction.

In a magnetic recording medium, an alloy magnetic thin film has been noticed as a magnetic material capable of providing good magnetic characteristics such as a high coercive force (Hc) and a high saturation magnetization (Ms) and having a high durability, and the compositions of various such alloy magnetic materials have been studied.

For example, Japanese Patent Laid-open Publication No. 58-7806 discloses a magnetic recording medium composed of $Co_xPt_y$ alloy, where x is set to 70–90 atomic % and y is set to 10–30 atomic %, the magnetic recording medium having magnetostriction ranging from $35 \times 10^{-6}$ through 0 to $\pm 10^{-6}$ according to the values of x and y. By setting the above composition, a high Hc of about 1700 Oe and a low magnetostrictive characteristic can be obtained.

Further, Japanese Patent Laid-open Publication No. 58-200513 discloses a magnetic recording medium composed of $Co_{100-y}Pt_y$ alloy, where y is set to 7–40 atomic %, thereby obtaining a high magnetic flux density (Bs) and a high Hc.

Such a CoPt alloy material has been studied and developed as a material of a magnetic recording medium adapted to carry out recording in an in-plane direction, e.g., a material of a hard disk. However, since Pt is expensive, there is a possibility of an increase in cost for manufacturing the magnetic recording medium.

As another material, Japanese Patent Laid-open Publication No. 61-224124 discloses a magnetic recording medium composed of Co base alloy containing 2–8 atomic % of one or more of Au, Ag, Pd, Rh, Re and Ir. By adding a small amount of Au, Pd, etc. to Co, improvement in corrosion resistance and weather resistance is contemplated, but in some case, a sufficiently desired coercive force of about 1000 Oe or more cannot be obtained depending upon a producing condition such as a burning condition. Further, in the producing step, the Co base alloy is deposited by sputtering or the like in an atmospheric gas containing $N_2$ gas, wherein a content of N is set to 0.2–5 atomic %. However, it is difficult to control the content of N.

As a magnetic recording material having a perpendicular magnetic anisotropy, Japanese Patent Laid-open Publication No. 1-191318 discloses a magnetic recording medium composed of $Co_{100-x}Pd_x$ where x is set to 60–90 atomic %, thereby obtaining a good Hc, good rectangular ratio, and improved durability. However, the value of Hc in an in-plane direction is insufficient such as about 200–300 Oe.

Similarly, Japanese Patent Laid-open Publication No. 2-30104 discloses a magnetic recording medium composed of $Co_{100-x}Pd_x$ where x is set to 50–90 atomic % and a film thickness is set to 1000 Å or less, thereby improving a perpendicular magnetic anisotropy, corrosion resistance and durability. However, also in this case, a high Hc in an in-plane direction is difficult to obtain.

Further, Japanese Patent Laid-open Publication No. 2-3102 discloses a magnetic recording medium composed of an artificial lattice film having an overall thickness of 50–800 Å formed by alternately laminating Co, Pd and Pt, Co and Pd, or Co and Pt, thereby improving a corrosion resistance, durability and perpendicular magnetic anisotropy to obtain a high Hc. However, also in this case, it is difficult to obtain a high Hc in an in-plane direction.

SUMMARY OF THE INVENTION

It is accordingly an object of the present invention to provide a magnetic recording medium which can obtain a sufficiently high Hc in an in-plane direction and a sufficiently high Ms.

It is another object of the present invention to provide a magnetic recording medium which can be produced at a low cost.

According to the present invention, there is provided in a magnetic recording medium including a substrate and an alloy thin film magnetic layer formed on said substrate, the improvement characterized in that said magnetic layer is composed of $Co_{100-y}(Pt_{100-x}Pd_x)_y$ where x is set to $0 < x \leq 80$ (atomic %), and y is set to $10 \leq y \leq 35$ (atomic %).

The magnetic recording medium of the present invention has a high durability similar to that of a magnetic recording medium composed of CoPt alloy, and can obtain a high Hc of 1000 Oe or more and a high Ms of 500 emu/cc or more.

Furthermore, as the content of Pt which is expensive can be relatively reduced, a wide cost reduction can be substantially realized.

Other objects and features of the invention will be more fully understood from the following detailed description and appended claims when taken with the accompanying drawings.

DETAILED DESCRIPTION OF THE PREFERRED EMBODIMENT

Figure 1:
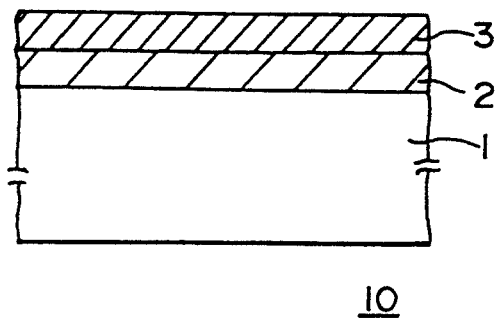
FIG. 1 is a schematic enlarged sectional view of the magnetic recording medium according to the present invention.

A preferred embodiment of the magnetic recording medium according to the present invention will now be described with reference to FIGS. 1 to 4. The preferred embodiment is applied to a hard disk. Referring to FIG. 1, reference numeral 1 designates a substrate such as a glass substrate, polycarbonate substrate, or Al substrate plated with NiP. Reference numeral 2 designates an under layer formed on the substrate 1 by evaporation, sputtering, etc. of Mo, Cr, etc. The under layer 2 has a thickness of 0.05–0.1 μm, e.g., 0.05 μm. Reference numeral 3 designates an alloy thin film magnetic layer of CoPtPd formed on the under layer 2 by sputtering or the like. The magnetic layer 3 has a thickness of 0.01–0.2 μm, e.g., 0.08 μm. Thus, a magnetic recording medium 10 according to the present invention is obtained. In the alloy thin film magnetic layer 3, an in-plane coercive force Hc and a saturation magnetization Ms with respect to a change in content of Pd were investigated, and the results are shown in FIGS. 2 and 3.

Figure 2:
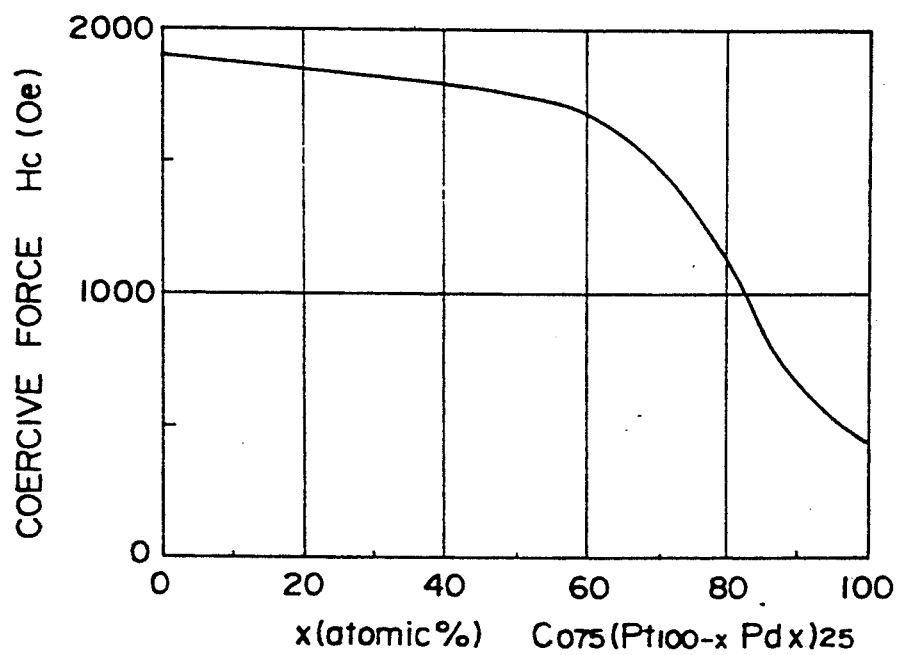
FIG. 2 is a graph illustrating a change in coercive force of CoPtPd with respect to a content of Pd.

FIG. 2 shows a change in the in-plane coercive force Hc with respect to a change in x of $Co_{75}(Pt_{100-x}Pd_x)_{25}$. It is understood from FIG. 2 that when x is more than 80 atomic %, it is difficult to obtain a desired Hc of 1000 Oe or more. It is therefore necessary to set the content x of Pd to $0 < x \leq 80$ (atomic %) according to the present invention.

Figure 3:
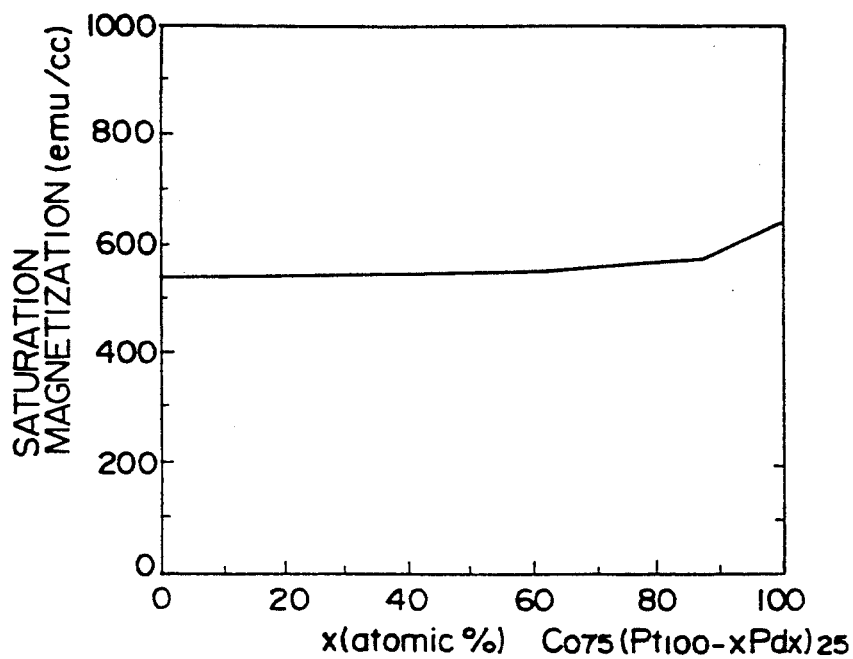
FIG. 3 is a graph illustrating a change in saturation magnetization of CoPtPd with respect to a content of Pd.

FIG. 3 shows a change in the saturation magnetization Ms with respect to a change in the content x of Pd in $Co_{75}(Pt_{100-x}Pd_x)_{25}$. It is understood from FIG. 3 that a sufficiently high Ms of 500 emu/cc or more can be stably obtained irrespective of the content of Pd.

Figure 4:
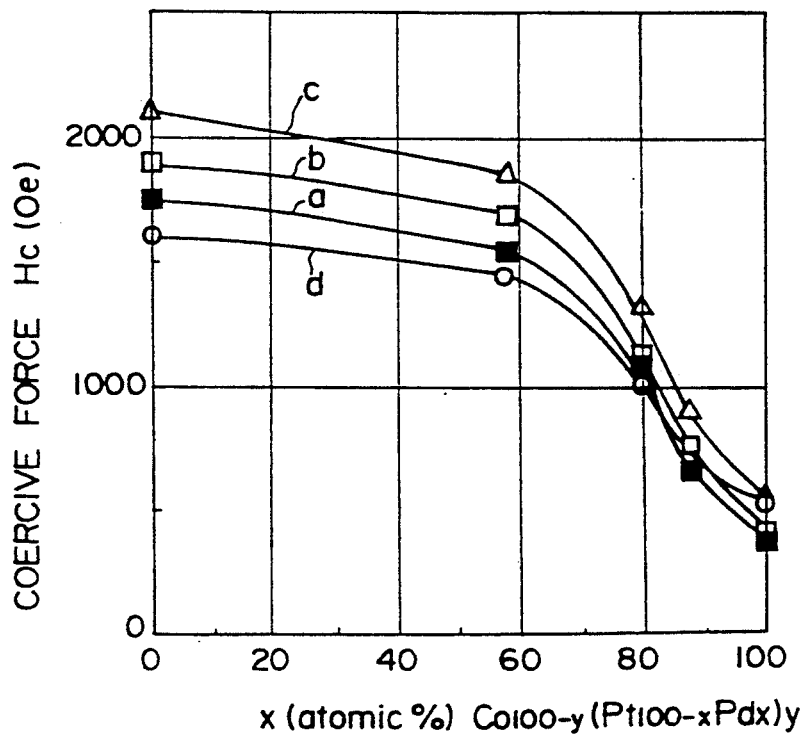
FIG. 4 is a graph illustrating a change in coercive force with respect to a change in composition of CoPtPd.

Furthermore, in the magnetic recording medium of the present invention, a content y of PtPd with respect to Co is set to $10 \leq y \leq 35$ (atomic %). This is due to the following reason. FIG. 4 shows a change in coercive force Hc with respect to a change in x and y of $Co_{100-y}(Pt_{100-x}Pd_x)_y$. In FIG. 4, curves a, b, c and d correspond to y=10, y=25, y=30 and y=35, respectively. It is understood that when the content y is set to y<10 or y>35, and the content x of Pd with respect to Pt becomes 80 atomic % or more, the coercive force Hc becomes less than 1000 Oe. Thus, a high Hc cannot be obtained. It is therefore necessary to set the content y to $10 \leq y \leq 35$ (atomic %) according to the present invention.

In this manner, by partially substituting Pd for Pt in the magnetic layer 3, the cost can be greatly reduced as compared with the case that the magnetic layer 3 is composed of CoPt only.

In the above preferred embodiment, the under layer 2 is formed on the substrate 1, and the alloy thin film magnetic layer 3 is formed on the under layer 2, so that the magnetic characteristics such as the coercive force Hc can be improved. However, various modifications may be made. For example, the alloy thin film magnetic layer 3 may be formed directly on the substrate 1 without forming the under layer 2.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. In a magnetic recording medium including a substrate underlayer, and an alloy thin film magnetic layer formed on said underlayer, the improvement characterized in that said magnetic layer consists of $Co_{100-y}(Pt_{100-x}Pd_x)_y$ where x is set to $0 < x \leq 80$, and y is set to $10 \leq y \leq 35$, wherein x and y are expressed in atomic percent, and wherein the coercive force in an in-plane direction is 1000 Oe or more.

2. The magnetic recording medium as defined in claim 1, wherein the saturation magnetization is 500 emu/cc or more.

* * * * *